United States Patent
Butterfield, IV

(10) Patent No.: US 9,027,224 B2
(45) Date of Patent: May 12, 2015

(54) METHODS AND DEVICES FOR INSTALLING TANK LINERS AND GASKETS

(71) Applicant: Albert Eugene Butterfield, IV, Novato, CA (US)

(72) Inventor: Albert Eugene Butterfield, IV, Novato, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 279 days.

(21) Appl. No.: 13/804,858

(22) Filed: Mar. 14, 2013

(65) Prior Publication Data

US 2014/0259621 A1 Sep. 18, 2014

(51) Int. Cl.
*B23P 19/00* (2006.01)
*F17C 3/00* (2006.01)

(52) U.S. Cl.
CPC ............ *B23P 19/00* (2013.01); *Y10T 29/53991* (2015.01); *Y10T 29/49947* (2015.01); *F17C 3/00* (2013.01)

(58) Field of Classification Search
CPC ..... B23P 19/00; F17C 3/00; Y10T 29/49947; Y10T 29/53991
See application file for complete search history.

(56) References Cited

U.S. PATENT DOCUMENTS

| 3,022,000 A | * | 2/1962 | Millis ............................ 234/114 |
| 7,943,087 B2 | | 5/2011 | McGuire et al. |
| 2010/0032031 A1 | | 2/2010 | Neal |
| 2014/0150617 A1 | * | 6/2014 | Marks et al. .................... 83/167 |

OTHER PUBLICATIONS

U.S. Appl. No. 13/483,986 filed May 30, 2012 . (44 pages).

* cited by examiner

*Primary Examiner* — Moshe Wilensky
(74) *Attorney, Agent, or Firm* — Karen R. DiDomenicis

(57) ABSTRACT

Disclosed are devices and methods useful for installing a liner and/or a gasket at the base of a tank, e.g., between the horizontal lips of a tank base chime and a tank wall panel. Devices including hollow cylindrical cutters are used to puncture the liner and/or gasket material. In one device, a depressable pedal causes the hollow cylindrical cutters to move upwardly to puncture the liner and/or gasket material. In an alternative device, at least one pneumatic cylinder causes the hollow cylindrical cutters to move downwardly to puncture the liner and/or gasket material. Another device installs bolts through the horizontal lips of the tank base chime and tank wall panel and the punctured liner and/or gasket material there between.

10 Claims, 6 Drawing Sheets

METHODS AND DEVICES FOR INSTALLING TANK LINERS AND GASKETS

FIELD

The present disclosure relates to apparatus for puncturing a liner and/or a gasket in a process to install a liner and/or a gasket used to seal the base of tanks such as liquid storage tanks. The present disclosure also relates to apparatus for inserting bolts in a process to install a liner and/or a gasket used to seal the base of tanks such as liquid storage tanks. The present disclosure also relates to methods for installing tank liners and/or gaskets using said apparatus.

BACKGROUND

Installing the liner and gasket used to seal the base of large liquid storage tanks is a very labor intensive effort. In common practice, this involves drilling holes and installing bolts and corresponding nuts through a base ring chime of the tank and a lip of the tank wall panel with the liner and gasket there between. Installation requires that each hole be reamed in the liner and gasket prior to installing the bolts, also referred to as chime bolts. Since a large liquid storage tank will have several hundred or even thousands of chime bolts, this installation requires significant time and effort for the installation crew. Associated with this are potential for human error as well as safety and ergonomic risk.

It would be desirable to improve the efficiency and reduce risks associated with the liner and gasket installation process, particularly the installation of large numbers of chime bolts.

SUMMARY

In one aspect, a device is provided for puncturing a liner and/or gasket in a process to install the liner and/or gasket between a horizontal lip of a base chime and a horizontal lip of a tank wall panel. At a minimum, the device includes a rigid support having an upper surface and a plurality of holes there through arranged in a row of holes having a first end and a second end, a plurality of circumferential holders affixed on the upper surface of the rigid support wherein each of the plurality of circumferential holders corresponds to each of the plurality of holes such that the plurality of circumferential holders is arranged in a row of circumferential holders having a first end and a second end, and a depressable pedal pivotally connected to the rigid support for controlling the vertical movement of the rigid support such that when the pedal is depressed, the rigid support moves upwardly. A plurality of hollow cylindrical cutters each having a cutting end and a base end can be held reversibly and securely by the plurality of circumferential holders.

In another aspect, a method is provided for puncturing a liner and/or gasket in a process to install the liner and/or gasket between a horizontal lip of a base chime and a horizontal lip of a tank wall panel using the device described above. The method includes positioning a liner and/or gasket between a horizontal lip of a base chime and a horizontal lip of a tank wall panel wherein the horizontal lip of the base chime and the horizontal lip of the tank wall panel have corresponding bolt holes there through, securing a plurality of hollow cylindrical cutters in the plurality of circumferential holders of the device, positioning the device beneath the horizontal lip of the base chime such that the plurality of hollow cylindrical cutters is aligned with the bolt holes of the base chime and the horizontal lip of the tank wall panel, depressing the depressable pedal of the device thereby raising the plurality of hollow cylindrical cutters such that the plurality of hollow cylindrical cutters pass through the bolt holes of the horizontal lip of the base chime and the horizontal lip of the tank wall panel and puncture the liner and/or gasket there between, and removing the device.

In another aspect, an alternative device is provided for puncturing a liner and/or gasket in a process to install the liner and/or gasket between a horizontal lip of a base chime and a horizontal lip of a tank wall panel, the device including a rigid support having an upper surface and a plurality of holes there through arranged in a row of holes having a first end and a second end, a plurality of circumferential guides affixed to the upper surface of the rigid support and corresponding to the plurality of holes, at least one clamp for securing the rigid support to a horizontal lip of a base chime and a horizontal lip of a tank wall panel in a desired location, a plurality of hollow cylindrical cutters capable of passing vertically through the plurality of circumferential guides and the plurality of holes wherein each hollow cylindrical cutter has a cutting end and a base end, a source of compressed air in communication with the plurality of hollow cylindrical cutters for controlling the vertical movement of the hollow cylindrical cutters, and a valve between the source of compressed air and the plurality of hollow cylindrical cutters for controlling the delivery of air to the hollow cylindrical cutters.

In another aspect, a method is provided for puncturing a liner and/or gasket in a process to install the liner and/or gasket between a horizontal lip of a base chime and a horizontal lip of a tank wall panel using the alternative device described above. The method includes positioning a liner and/or gasket between a horizontal lip of a base chime and a horizontal lip of a tank wall panel wherein the horizontal lip of the base chime and the horizontal lip of the tank wall panel have corresponding bolt holes there through, clamping the rigid support of the device to the horizontal lip of the base chime and the horizontal lip of the tank wall panel in an initial position such that the plurality of holes is aligned with the bolt holes of the base chime and the horizontal lip of the tank wall panel, inserting the cutting ends of the plurality of hollow cylindrical cutters attached to the plurality of pneumatic cylinders into the plurality of circumferential guides in an initial position, controlling the valve to allow air to be delivered from the source of compressed air to the plurality of pneumatic cylinders sufficient to move the pistons therein thereby causing the plurality of hollow cylindrical cutters to move downwardly and pass through the bolt holes of the horizontal lip of the base chime and the horizontal lip of the tank wall panel and puncture the liner and/or gasket there between, controlling the house to allow air to be delivered from the source of compressed air to the plurality of pneumatic cylinders such that the pistons move to cause the plurality of hollow cylindrical cutters to move upwardly thereby returning to the initial position, and removing the device.

In yet another aspect, a device is provided to insert bolts through the bolt holes of the base chime, the horizontal lip of the tank wall panel and the liner and/or gasket material there between. At a minimum, the device includes a rigid support having an upper surface, a plurality of circumferential holders affixed on the upper surface of the rigid support, and a depressable pedal pivotally connected to the rigid support for controlling the vertical movement of the rigid support such that when the pedal is depressed, the rigid support moves upwardly. A plurality of bolts can be held reversibly by the plurality of circumferential holders.

BRIEF DESCRIPTION OF THE DRAWINGS

These and other objects, features and advantages of the present invention will become better understood with reference to the following description, appended claims and accompanying drawings where:

DETAILED DESCRIPTION

Figure 1:
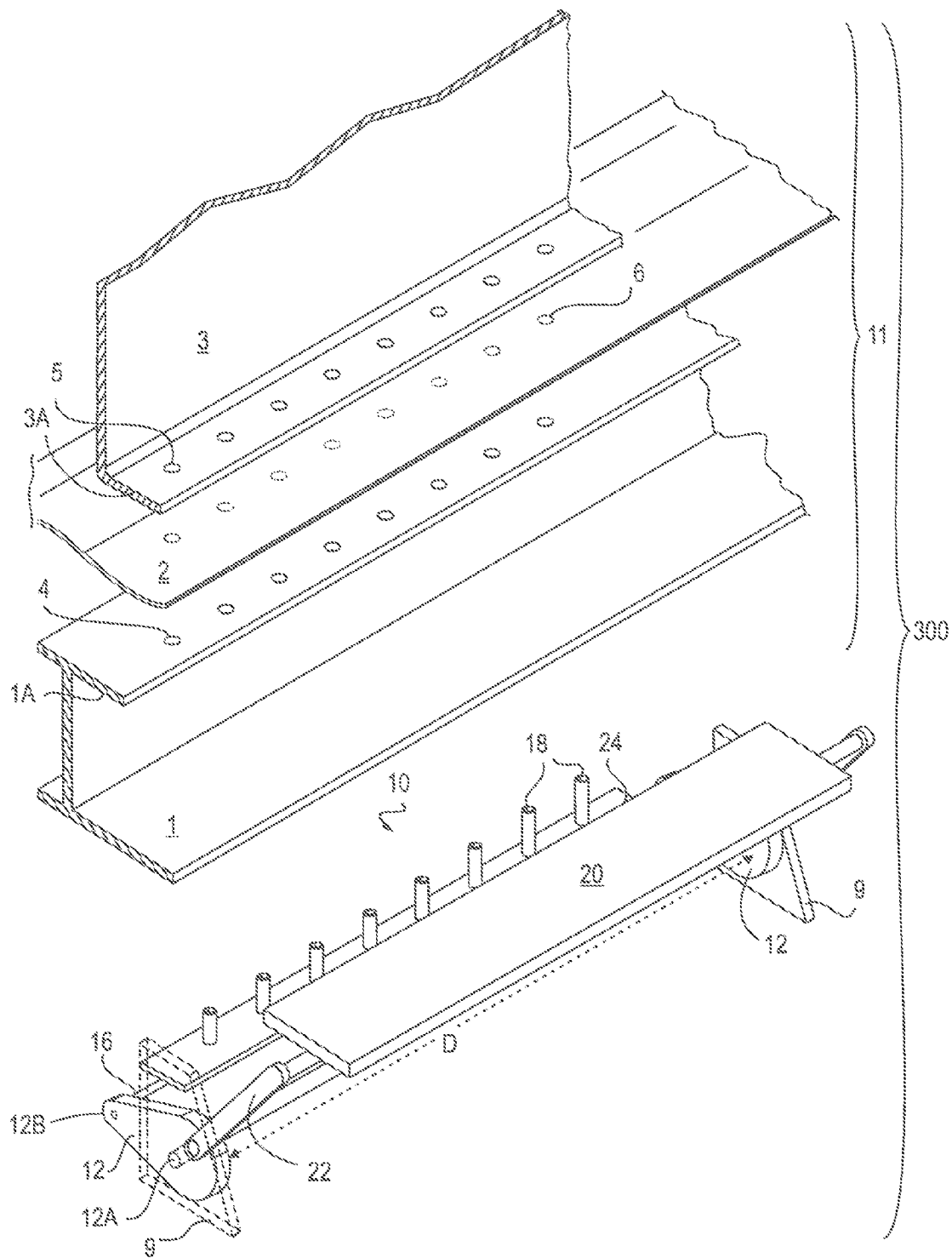
FIG. 1 is an exploded perspective view of a device according to one exemplary embodiment and an assembly of the horizontal lip of the wall panel, the base chime and the liner and/or gasket material, which taken together is the application target for the use of the devices and methods disclosed herein.

In some embodiments, the present disclosure provides devices and methods which allow multiple holes to be formed at once to facilitate the process of installing tank liners and gaskets at the base of liquid storage tanks, thus reducing installation time and manual effort. FIG. 1 illustrates one embodiment of a liner and/or gasket puncturing device 10 for providing holes through liners and/or gaskets, commonly shown as liner and/or gasket material 2, which are installed between a horizontal lip 1A of a base chime 1 and a horizontal lip 3A of a tank wall panel 3 in order to seal the tank. As shown in FIG. 1, the horizontal lip of the base chime 1A has holes 4 previously formed therein. Likewise, the horizontal lip of the wall panel 3A has holes 5 previously formed therein. Holes 4 and holes 5 are aligned with each other, with the liner and/or gasket material 2 there between. Future holes in the liner and/or gasket material 2 are indicated by reference numeral 6. Reference numeral 11 refers to the assembly of the horizontal lip of the wall panel 3A, the base chime 1 and the liner and/or gasket material 2, which taken together is the application target for the use of the devices and methods disclosed herein. The application target 11 and the liner and/or gasket puncturing device 10 taken together are referred to by reference numeral 300.

Figure 4A:
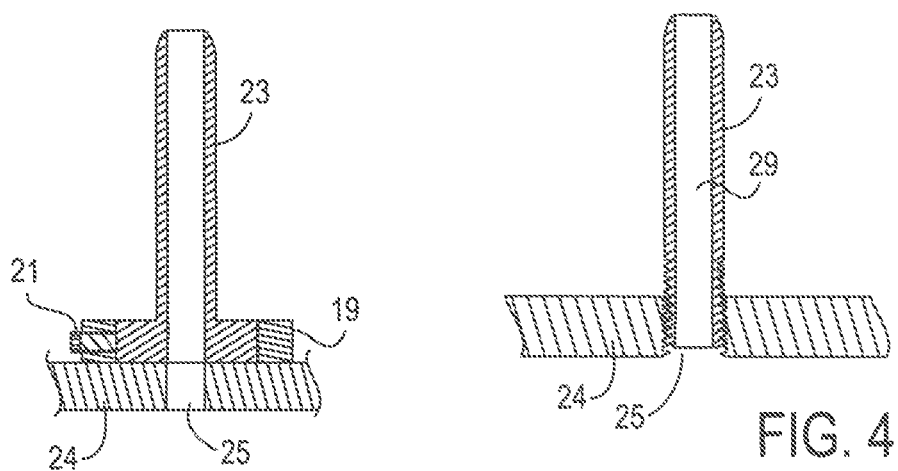
FIGS. 4A-4B are detailed side views of hollow cylindrical cutters in the support elements.
Figure 4B:
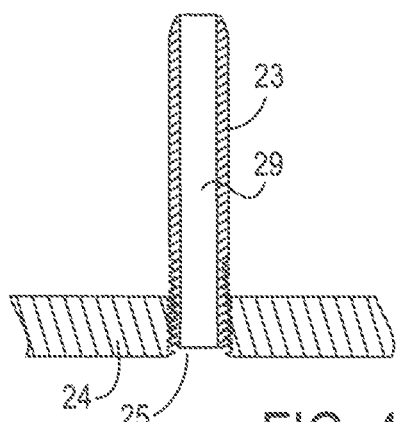

FIG. 1 illustrates one embodiment of a liner and/or gasket puncturing device 10 in which a depressable pedal 20 is pivotally connected to a rigid support 24. The rigid support 24 includes a row of holes 25 (shown in cutaway detail in FIG. 2A) there through. At each hole 25, a hollow cylindrical cutter 18 having a base end and a cutting end can be reversibly and securely held in place on or in the rigid support 24. As illustrated, the rigid support 24 can support a row of upwardly directed hollow cylindrical cutters 18. In one embodiment, as shown in FIG. 4A, each hollow cylindrical cutter 18 can be securely held in place through the use of a retaining or set screw 21 in a circumferential holder 19 on the rigid support 24 for surrounding the hollow cylindrical cutter 18. In another embodiment, as shown in FIG. 4B, each hollow cylindrical cutter 18 can be securely held in place by threads on the outside of the hollow cylindrical cutter 18 which mate with threads in the holes 25. As shown in FIG. 4B, each hollow cylindrical cutter 18 preferably is hollow with a passageway 29 there through so that liner and/or gasket material that is cut by the cutting end of each cutter 18 is allowed to pass through the hollow cylindrical cutter 18 and through the corresponding hole 25 in the rigid support 24. This keeps the hollow cylindrical cutters clear for multiple uses during one installation. The hollow cylindrical cutters 18 can alternatively be held in place on the rigid support 24 by any suitable means as would be apparent to one skilled in the art, such as by welding.

The vertical movement of the depressable pedal 20 controls the vertical movement of the rigid support 24 and thereby also controls the vertical movement of the hollow cylindrical cutters 18. In the embodiment illustrated in FIGS. 1 and 2A-2B, a pair of cams 12 is spaced a desired distance D apart. By "cam" is meant a flat plate of a certain thickness having a shape such that the cam is capable of transforming rotary motion into linear motion and vice-versa. Without wishing to be limited, the shape can be, for example, generally pear-shaped or teardrop-shaped (as shown). In one embodiment, at least a portion of the perimeter of the cam shape is equidistant from a cam center 12A, and a portion of the perimeter of the cam shape extends to a cam point 12B.

Figure 3A:
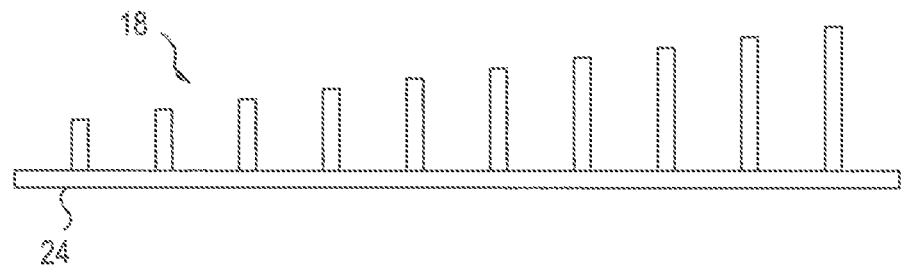
FIGS. 3A-3B are simplified side views of support elements for use in the device.
Figure 3B:
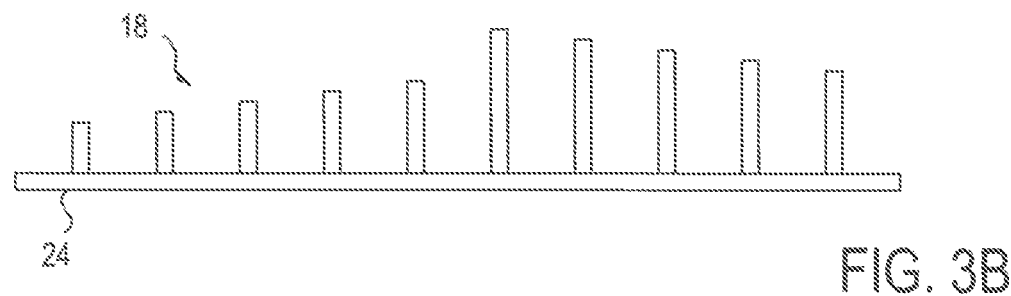

In one embodiment, the cam centers 12A are connected by a first rod 14. The cam points 12B are connected by a second rod 16. In one embodiment, the rigid support 24 is attached to the second rod 16. As shown in FIGS. 3A-3B, the hollow cylindrical cutters 18 are advantageously of varying height so that all of the hollow cylindrical cutters 18 are not forced through the liner and/or gasket material simultaneously, thus reducing the force necessary for the hollow cylindrical cutters 18 to pierce the liner and/or gasket material. In one embodiment, the height of each of the plurality of hollow cylindrical cutters 18 increases sequentially from one end to the other end of the row, as shown in FIG. 3A. In one embodiment, the heights of all of the plurality of hollow cylindrical cutters 18 are different from one another, as shown in FIG. 3B.

The depressable pedal 20 is used for controlling the movements of the cams 12, thereby in turn controlling the vertical movement of the rigid support 24 and by extension, the vertical movement of the hollow cylindrical cutters 18. Linkages 22 connect the depressable pedal 20 to the cams 12. The depressable pedal 20 can be operated by any convenient means, such as by foot, in which case the pedal 20 can be depressed into a down position by pressure applied by an operator's foot. Alternatively, the depressable pedal 20 can be operated by an automated means such as by air pressure applied to the linkages 22 or the pedal 20 by pneumatic control. Other means will be apparent to those skilled in the art.

Advantageously, the device 10 is fixed in place at the desired location to ensure alignment of the hollow cylindrical cutters 18 with the bolt holes of the horizontal lips of the base chime and the tank wall panel. This can be accomplished by any of a number of means that will be apparent to one skilled in the art. For example, a wedge 9 can be sized to securely fit between the upper lip 1A and a lower lip of the base chime 1, and attached at either end of the device. Alternatively, a clamp (not shown) can be attached to the first rod 14 and attached to the rigid support 24 at index locations, such as over index bolts or reference bolts which are preinstalled at desired locations. The clamps can optionally include index pins to align the device with the existing bolt holes in the corresponding horizontal lips of the base chime and the tank wall panel prior to the start of the operation to ensure that the device is positioned correctly. Suitable clamps include bar clamps, bench clamps, C clamps, magnetic clamps and the like. The clamp can further include a base which can be supported by the ground nearby.

Figure 2A:
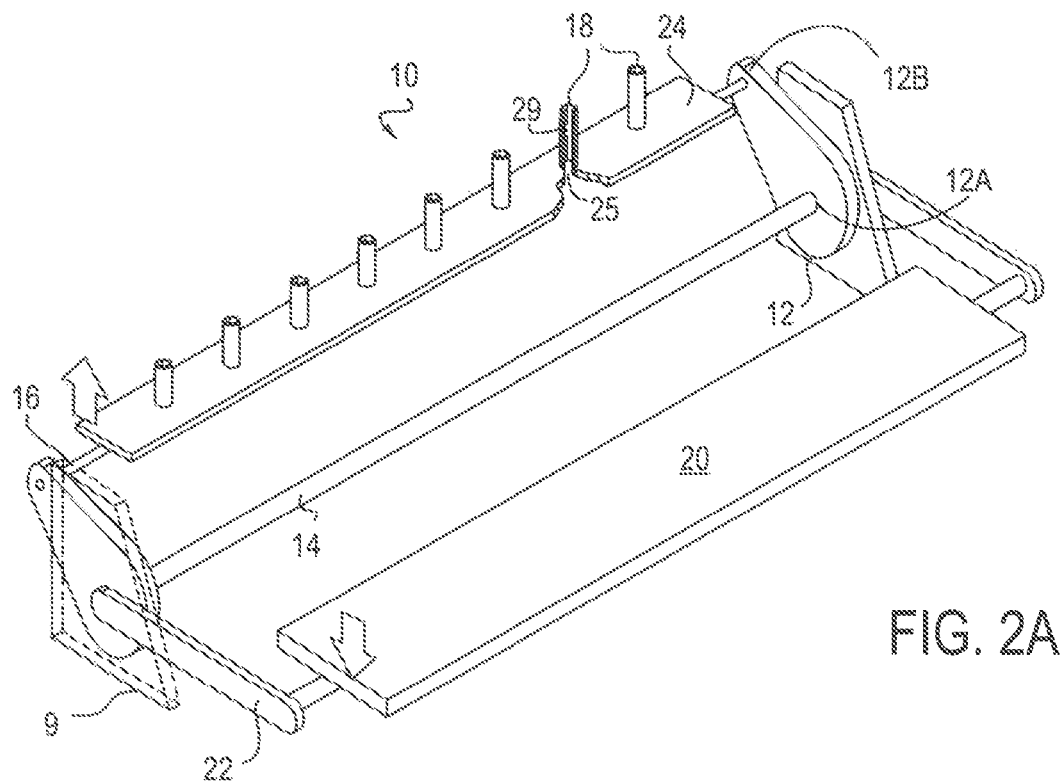
FIGS. 2A-2B are perspective views of the device.
Figure 2B:
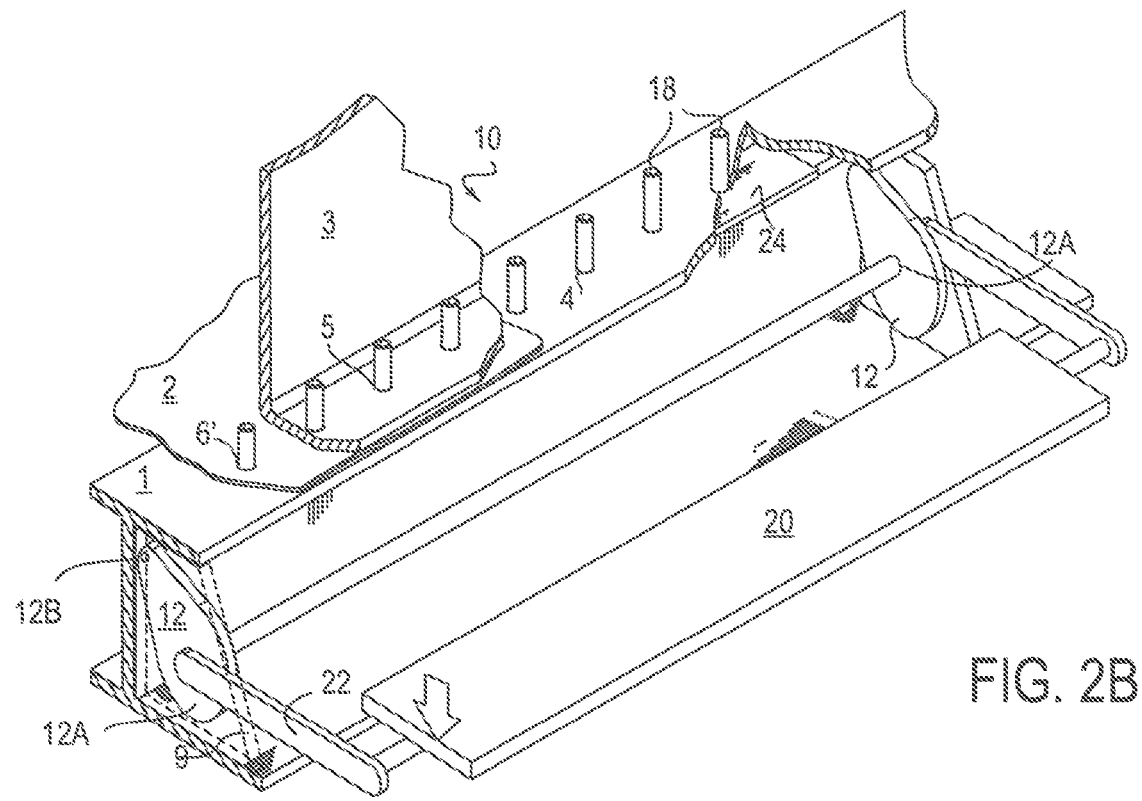

In one embodiment, a method for installing liners and/or gaskets at the base of a liquid storage tank is provided using the device 10. First the liner or gasket material 2 is positioned in the desired location between a horizontal lip 1A of a base chime 1 and a horizontal lip 3A of a tank wall panel 3. The horizontal lip of the base chime and the horizontal lip of the tank wall panel have aligned corresponding bolt holes there through, as indicated by 4 and 5, respectively. Hollow cylindrical cutters 18 are secured on or in the rigid support 24 of the device 10 such that the cutting ends are facing upwardly. The device 10 is then fixed in the desired location using an appropriate fixing means, such as wedges 9 or clamps (not shown). The device 10 is positioned beneath the horizontal lip 1A of the base chime such that the plurality of hollow cylindrical cutters 18 is aligned with the bolt holes of the base chime and the horizontal lip of the tank wall panel. Initially, as shown in FIG. 1, the depressable pedal 20 is in the upper position, and as such, the rigid support 24 and the hollow cylindrical cutters 18 are in the lower position. The depressable pedal 20 of the device is depressed as indicated in FIG. 2A thereby raising the plurality of hollow cylindrical cutters such that the plurality of hollow cylindrical cutters 18 pass through the bolt holes of the horizontal lip of the base chime and the horizontal lip of the tank wall panel and puncture the liner and/or gasket material 2 there between as indicated in FIG. 2B. Upon depression of the pedal 20, the linkages 22 translate the motion to the cams 12. The motion of the cams 12 causes the plurality of hollow cylindrical cutters 18 to be raised. The plurality of hollow cylindrical cutters 18 thus pass through the bolt holes of the horizontal lip of the tank wall panel and the horizontal lip of the base chime, respectively, and puncture the liner and/or gasket material 2 there between. The hollow cylindrical cutters are then retracted and the device 10 can be unclamped and removed. Bolts 23 can then be installed through the horizontal lip of the base chime, the liner and/or gasket and the horizontal lip of the tank wall panel. Corresponding nuts 27 can then be installed on the bolts 23.

Figure 5A:
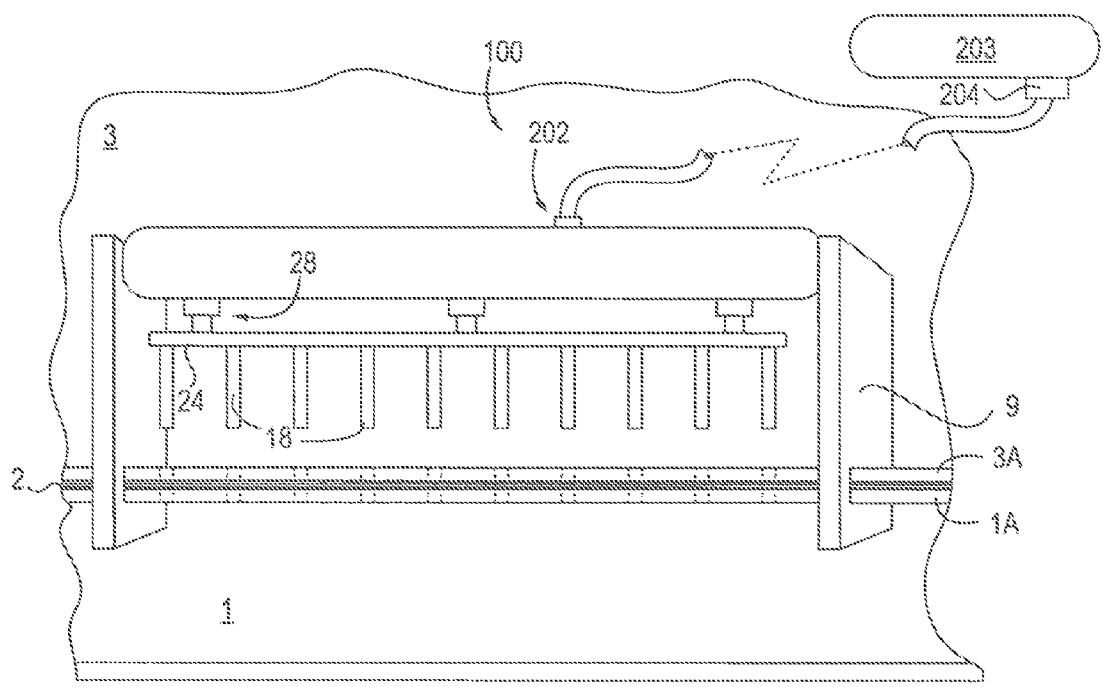
FIGS. 5A-5B are front views of a device according to another exemplary embodiment.
Figure 5B:
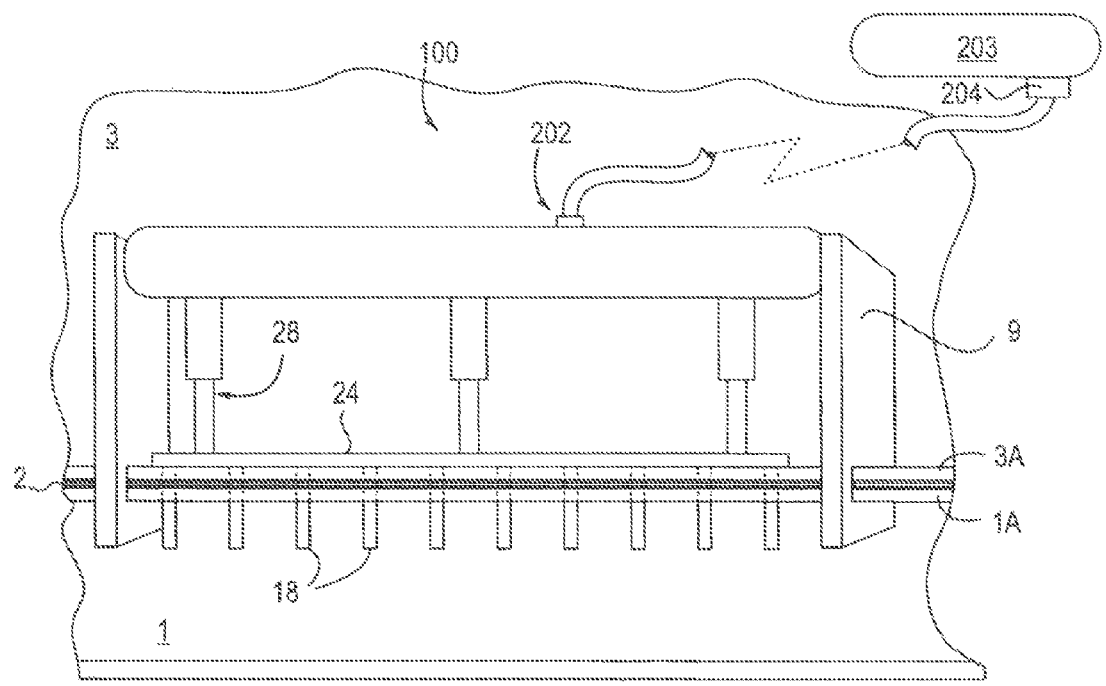

FIGS. 5A and 5B illustrate an alternative embodiment of a liner and/or gasket puncturing device 100. A rigid support 24 has a plurality of hollow cylindrical cutters 18 securely held in place in a row protruding downward from the rigid support 24. A plurality of optional guides or a solid support having guide holes therein (not shown) can be affixed to the upper surface of the horizontal lip 1A of the base chime 1, each guide or guide hole corresponding to one of the plurality of holes. The plurality of hollow cylindrical cutters 18 is capable of passing vertically, cutting end down, through the plurality of optional guides and through the corresponding holes 4 and 5 in the horizontal lip 1A of the base chime 1 and the horizontal lip 3A of the wall panel 3, respectively, and the liner and/or gasket material 2 there between. The device 100 can be secured in place at the desired location by any practical means. Shown is a fixing means 9 consisting of a slotted block. One or more clamps could also be used for securing the rigid support 24 to the horizontal lip of the base chime and the horizontal lip of the tank wall panel. A source of compressed air 203 in communication with the plurality of hollow cylindrical cutters 18 controls the vertical movement of the hollow cylindrical cutters 18. A valve or switch 204 is provided between the source of compressed air and a manifold 202 which is further in communication with the plurality of hollow cylindrical cutters for controlling the delivery of air to the hollow cylindrical cutters 18. The source of compressed air can be connected to a plurality of pneumatic cylinders 28 each pneumatic cylinder having a piston therein which controls the vertical movement of the rigid support 24. The pneumatic cylinders 28 can be directly attached to the rigid support 24, as shown.

Figure 6A:
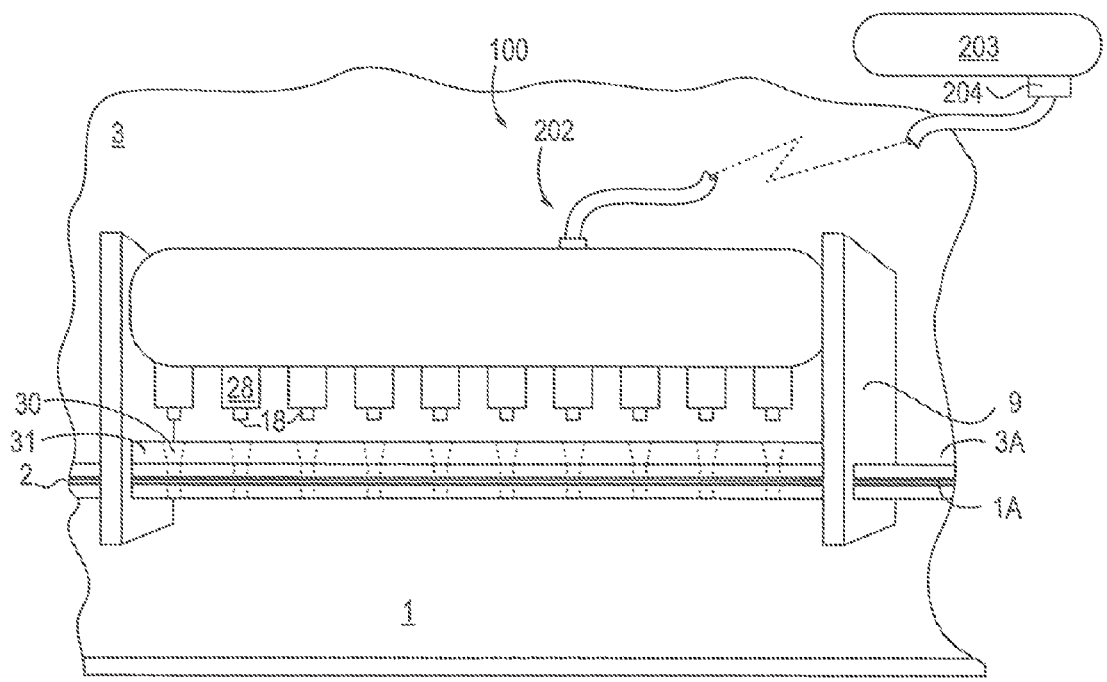
FIGS. 6A-6B are front views of a device according to another exemplary embodiment.
Figure 6B:
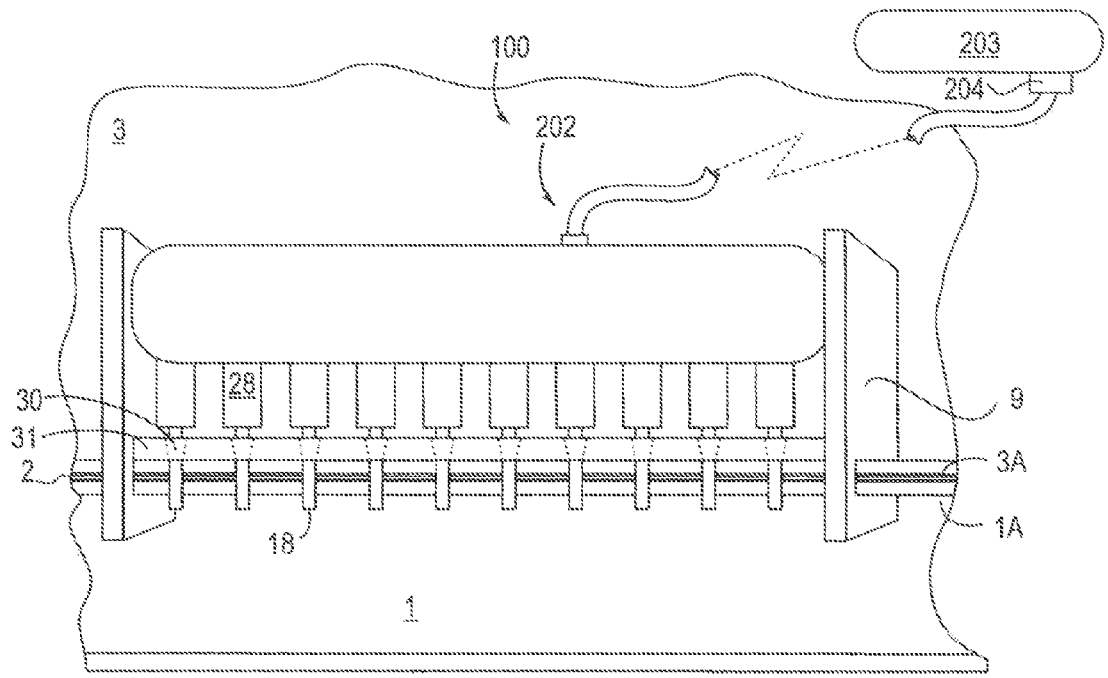

In an alternative embodiment, as shown in FIGS. 6A and 6B, the pneumatic cylinders 28 can be integrated with the hollow cylindrical cutters 18. In this embodiment, a separate pneumatic cylinder 28 is provided for each cutter 18. As shown, a solid support 31 having guide holes therein 31 can be affixed to the upper surface of the horizontal lip 1A of the base chime 1, each guide or guide hole corresponding to one of the holes 4 in the horizontal lip 1A of the base chime 1. An example of a suitable integrated pneumatic cylinder and hollow cylindrical cutter is commercially available as "Blue and Improved" Original Line® hole punch cylinder available from Bimba Manufacturing Company (University Park, Ill.). Alternative suitable pneumatic cylinders can be determined by those skilled in the art.

In one embodiment, a method for installing liners and/or gaskets at the base of a liquid storage tank is provided using the device 100 as shown in FIGS. 6A and 6B. First, the liner or gasket material 2 is positioned in the desired location between a horizontal lip 1A of a base chime 1 and a horizontal lip 3A of a tank wall panel 3. The horizontal lip of the base chime and the horizontal lip of the tank wall panel have aligned corresponding bolt holes there through, as indicated by 4 and 5, respectively. The device 100 is then fixed with a fixing means 9 to the horizontal lip of the base chime and the horizontal lip of the tank wall panel in the desired location such that the plurality of hollow cylindrical cutters 18 holes are aligned with the bolt holes of the base chime and the horizontal lip of the tank wall panel, as shown in FIG. 6A. The plurality of hollow cylindrical cutters is directed cutting end down in the plurality of circumferential guides. Next, a valve or switch 204 is operated to allow air to be delivered from the source 203 of compressed air to the plurality of pneumatic cylinders 28 thus moving pistons there within. The pistons drive the hollow cylindrical cutters 18 to move vertically (downwardly) through the bolt holes of the horizontal lip of the base chime and the horizontal lip of the tank wall panel and puncture the liner or gasket material 2 there between, as shown in FIG. 6B. After the air pressure is relieved, air pressure can be applied to the cylinders in the opposite direction thus returning the pistons within the cylinders to their original position and thereby retracting the hollow cylindrical cutters 18. At this point, the device 100 can be removed. Bolts 23 can then be installed through the horizontal lip of the base chime, the liner or gasket and the horizontal lip of the tank wall panel. Corresponding nuts 27 can then be installed on the bolts 23.

Figure 7A:
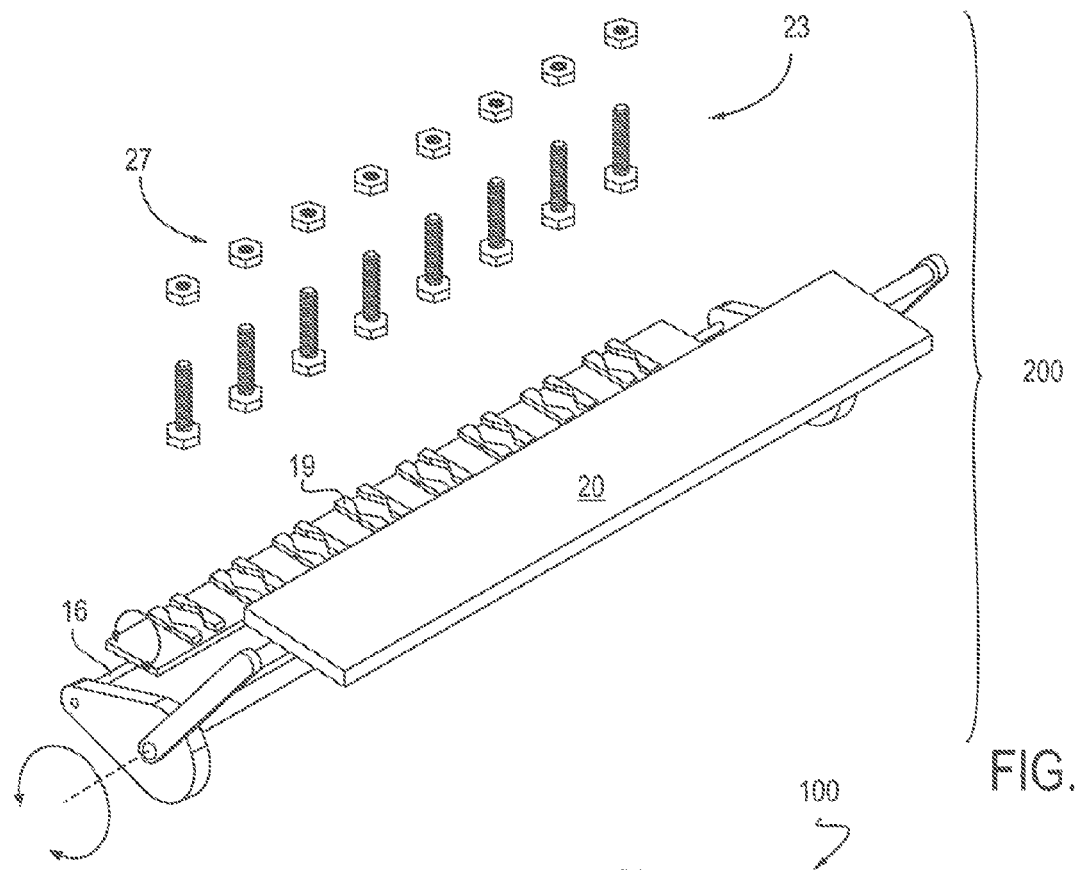
FIGS. 7A-7B are perspective views of a device according to one exemplary embodiment.
Figure 7B:
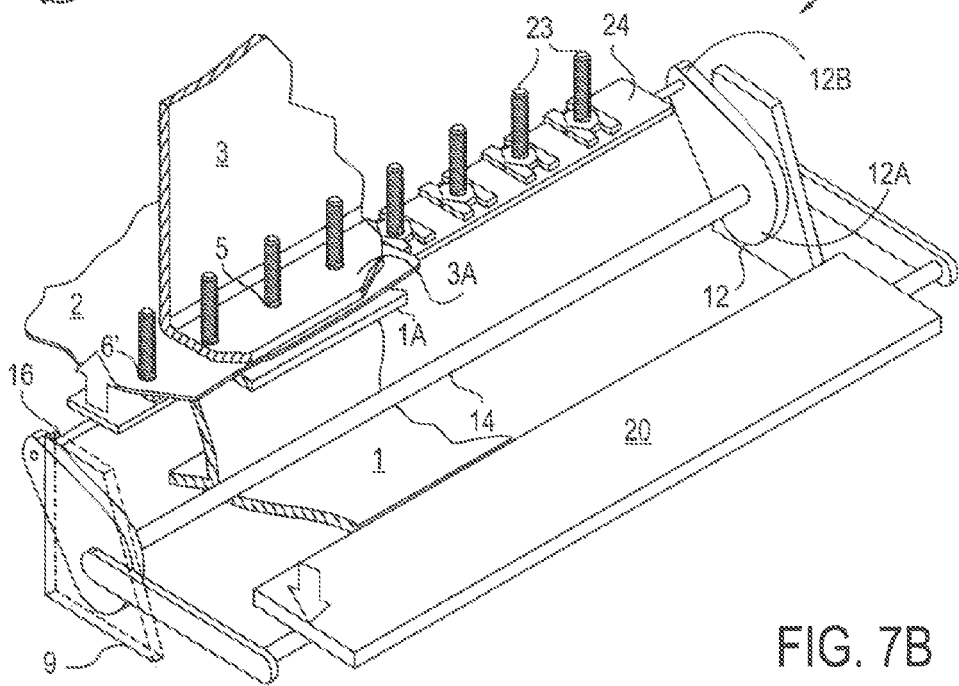

In some embodiments, once the device 10 or the device 100 is used to puncture the liner or gasket, a device 200 as illustrated in FIGS. 7A and 7B can be used to install the bolts 23 through the horizontal lips of the base chime and the tank wall panel and the liner or gasket there between. The device 200 includes a rigid support 24 having an upper surface, and a plurality of bolt head holders 19 affixed on the upper surface of the rigid support arranged in a row. Each of the plurality of bolt head holders includes a magnet (not shown) for reversibly holding the head of a bolt. As in the liner and/or gasket puncturing device 10 described above, a depressable pedal 20 is pivotally connected to the rigid support 24 for controlling the vertical movement of the rigid support such that when the pedal is depressed, the rigid support moves upwardly.

In one embodiment, the device 200 can be a modified version of the liner and/or gasket puncturing device 10. In this embodiment, the hollow cylindrical cutters 18 are removed from the device 10. In place of the hollow cylindrical cutters 18, a plurality of upwardly directed bolts 23 can be inserted. In this embodiment, the heads of the bolts are held in place reversibly by magnetic force rather than being secured in place as were the plurality of hollow cylindrical cutters. The device having the upwardly directed bolts 23 in place in the holders 19 is then positioned such that the bolts 23 are aligned with respect to the bolt holes 4 and 5 of the base chime 1 and the horizontal lip of the tank wall panel 3, respectively. Next, the device is operated to install the bolts 23 in the bolt holes, by pressing the depressable pedal 20 to the depressed position, thereby raising the rigid support 24 such that the upwardly directed bolts pass through the bolt holes of the horizontal lip of the base chime, the liner or gasket and the horizontal lip of the tank wall panel. Nuts 27 can then be attached to the upwardly directed bolts. The depressable pedal 20 can then be returned to the elevated position, thereby lowering the rigid support 24 such that the device can be disengaged from the base chime.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A device for in-situ puncturing of a liner and/or gasket during installation of the liner and/or the gasket between a horizontal lip of a base chine and a horizontal lip of a tank wall panel comprising:
   a. a pair of end supports spaced a distance apart and adapted to fit securely between the horizontal lip of the base chime and the horizontal lip of the tank wall panel;
   b. a pair of cams, each cam adjacent and rotatably coupled to one of the end supports and having a cam center and a cam point;
   c. a first rod between and connecting the cam centers;
   d. a second rod between and connecting the cam points;
   e. a rigid support having an upper surface and a plurality of holes there through arranged in a row of holes having a first end and a second end and wherein the rigid support is affixed to the second rod;
   f. a plurality of circumferential holders affixed on the upper surface of the rigid support wherein each of the plurality of circumferential holders corresponds to each of the plurality of holes such that the plurality of circumferential holders is arranged in a row of circumferential holders having a first end and a second end; and
   g. a depressable pedal pivotally connected to the rigid support and connected by linkages to the cams for controlling the vertical movement of the rigid support;
   wherein when the pair of end supports are fit securely between the horizontal lip of the base chime and the horizontal lip of the tank wall panel, the upper surface of the rigid support is below the horizontal lip of the tank wall panel, and wherein when the pedal is depressed, the rigid support moves upwardly towards the horizontal lip of the tank wall panel.

2. The device of claim 1, further comprising:
   at least one clamp for securing the device to the horizontal lip of the base chime and the horizontal lip of the tank wall panel in a desired location.

3. The device of claim 1, further comprising:
   a plurality of hollow cylindrical cutters wherein each hollow cylindrical cutter has a cutting end and a base end capable of being held reversibly and securely by one of the plurality of circumferential holders.

4. The device of claim 3, wherein each of the plurality of circumferential holders comprises a retaining screw for securely holding the base end of each hollow cylindrical cutter.

5. The device of claim 3, wherein the plurality of hollow cylindrical cutters are held by the plurality of circumferential holders and comprises hollow cylindrical cutters of varying height.

6. The device of claim 5, wherein the height of the each of the plurality of hollow cylindrical cutters increases in height sequentially from the first end to the second end of the row of circumferential holders.

7. The device of claim 3, wherein the cutting end of each of the plurality of hollow cylindrical cutters comprises a serrated cutting edge.

8. A device for in-situ puncturing of a liner and/or gasket during installation of the liner and/or the gasket between a horizontal lip of a base chime and a horizontal lip of a tank wall panel comprising:
   a. a rigid support having an upper surface and a plurality of holes there through arranged in a row of holes having a first end and a second end;
   b. a plurality of circumferential guides affixed to the upper surface of the rigid support and corresponding to the plurality of holes;
   c. at least one clamp for securing the rigid support to a horizontal lip of a base chime and a horizontal lip of a tank wall panel in a desired location;
   d. a plurality of hollow cylindrical cutters capable of passing vertically through the plurality of circumferential guides and the plurality of holes wherein each hollow cylindrical cutter has a cutting end and a base end;
   e. a source of compressed air in communication with the plurality of hollow cylindrical cutters for controlling the vertical movement of the hollow cylindrical cutters; and
   f. a valve between the source of compressed air and the plurality of hollow cylindrical cutters for controlling the delivery of air to the hollow cylindrical cutters.

9. The device of claim 8, wherein the source of compressed air is connected to a plurality of pneumatic cylinders comprising pistons wherein each of the plurality of hollow cylindrical cutters is attached to a pneumatic cylinder comprising a piston.

10. A device for installing bolts through a horizontal lip of a base chime and a horizontal lip of a tank wall panel having a liner and/or a gasket there between, comprising:
    a. a rigid support having an upper surface;
    b. a plurality of circumferential bolt head holders affixed on the upper surface of the rigid support such that the plurality of circumferential bolt head holders is arranged in a row having a first end and a second end wherein each of the plurality of circumferential bolt head holders comprises a magnet for reversibly holding the head of a bolt; and
    c. a depressable pedal pivotally connected to the rigid support for controlling the vertical movement of the rigid support such that when the pedal is depressed, the rigid support moves upwardly.

* * * * *